United States Patent [19]

Pampel

[11] 4,308,111
[45] Dec. 29, 1981

[54] DISTILLATION PROCESS

[76] Inventor: Leonard F. Pampel, 8982 S. 77th St., Franklin, Wis. 53132

[21] Appl. No.: 122,336

[22] Filed: Feb. 19, 1980

[51] Int. Cl.³ .............................................. B01D 3/02
[52] U.S. Cl. ....................................... 203/49; 203/75; 203/78; 203/82; 203/84; 203/88; 203/DIG. 1
[58] Field of Search .................... 202/182, 185 R, 200, 202/202, 234, 236; 203/88, 49, DIG. 1, 73, 78, 82, 84, 75; 62/38, 39

[56] References Cited

U.S. PATENT DOCUMENTS

| 3,303,105 | 2/1967 | Konikoff et al. | 202/200 |
| 3,540,986 | 11/1970 | Guarino | 202/200 |
| 3,960,668 | 6/1976 | Rush | 202/234 |

Primary Examiner—Frank Sever
Attorney, Agent, or Firm—Hume, Clement, Brinks, Willian & Olds, Ltd.

[57] ABSTRACT

A distillation device is provided which comprises a vaporization zone, a condensation zone, a vapor permeable barrier between the vaporization zone and the condensation zone comprising a membrane having a plurality of openings, and means for maintaining an air pressure gradiant across the barrier whereby air pressure on the vaporization zone side of the membrane is greater than air pressure on the condensation zone side of the membrane. A solar energy distillation device is also provided which comprises an enclosed air heating compartment including at least one glass panel exposed to solar radiation, an enclosed evaporation compartment including a reservoir of liquid to be distilled, an enclosed condensation chamber provided with means for cooling air and means for removal of distillate, an enclosed air conduit system that provides air flow through the air heating compartment, to and through the evaporation compartment, to and through the condensation chamber, a vapor permeable barrier across the air conduit system forming an inlet to said condensation chamber comprising a membrane having a plurality of openings, and means providing an air pressure gradient across the vapor permeable barrier whereby air flow through the air conduit system is maintained.

11 Claims, 2 Drawing Figures

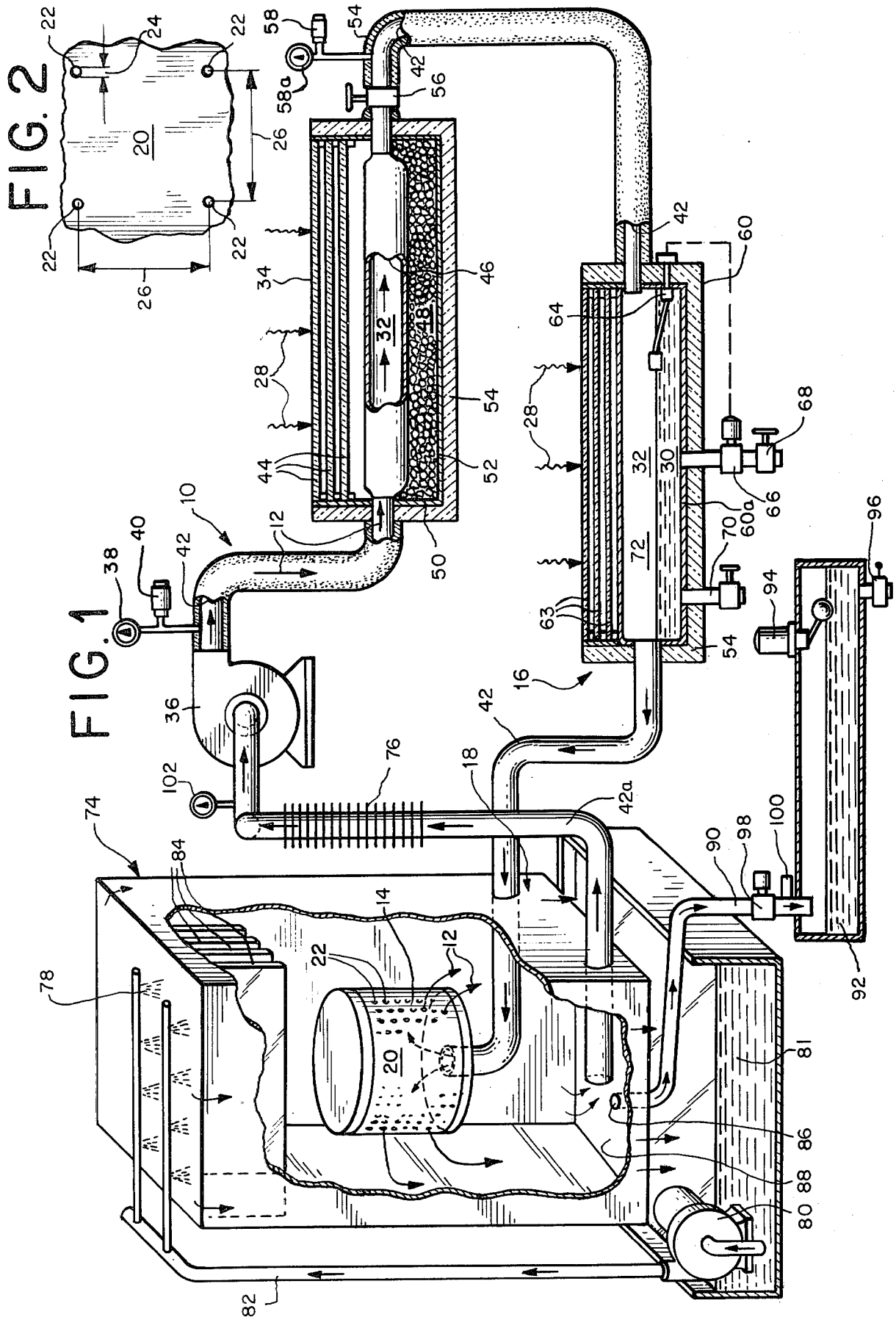

DISTILLATION PROCESS

TECHNICAL FIELD

The present invention provides an improvement in the field of distillation methods, and in particular, an improvement in the field of distillation methods which utilize solar energy for a significant portion of their energy requirements.

BACKGROUND OF THE INVENTION

Distillation devices generally convert a liquid, for instance water or ethyl alcohol, to a vapor, transport the vapor to a position remote from its source, and convert the vapor back to its liquid state. The liquid that has been so distilled, i.e., the distillate, is thereby separated from substances that do not vaporize under the conditions used to vaporize the liquid in question. Such non-vaporizable substances can be considered "impurities" for some purposes, but often such impurities are themselves important products of the distillation process. Distillation is essentially a separation process and the relative value of separated products does not alter this essential characteristic.

Water is typically distilled to separate it from dissolved solids, such as salts or the like. Alcohol is typically distilled to separate it from the solid matter of the mash in which the alcohol is brewed. In either typical case, of course, the salts or mash, which are freed from at least a substantial portion of the water or alcohol, can be a valuable distillation product. It is, however, the water or alcohol distillate that is recovered free of other components of the water or alcohol source. For simplicity, therefore, the other substances present in the source of the distillate will be referred to hereinafter as impurities.

All distillation processes have a net energy requirement. Energy is required to convert the liquid in the source material to its vapor state. Although energy is released upon condensation of the vapor to a liquid, it is typically transferred to a cooling medium, such as cooling waters, remote from the area of energy input and in a form unsuitable for cycling. The less net energy requirement necessary to maintain a distillation process, the greater the efficiency of the process.

The use of solar energy for a significant portion of the net energy requirements reduces the energy input from other sources that can be costly and often limited in availability. Solar energy has not generally been used in distillation processes herebefore because of difficulties in efficient use of solar energy for such a purpose, i.e., difficulties in the build-up, storage, and transfer of the energy.

Energy is also generally required to condense the vapor. Energy is necessary at this stage at least to circulate the cooling medium. Rapid and effective condensation with minimum energy input at this stage of the distillation process increases the overall efficiency of the process.

Distillation processes additionally include those processes that separate one vaporizable liquid from another, and in such processes, commonly referred to as fractional distillations, efficient transportation of vapors to remote areas becomes a more significant aspect. (Fractional distillation processes depend on the phenomena that gaseous molecules move at rates dependent upon their molecular weights, other factors being the same. A gas molecule of a given molecular weight will move faster than a gas molecule of greater molecular weight.) Gas molecules, of course, will diffuse to occupy the entire available volume. In an air pressure gradient where space having a lesser density of gas molecules is available, a net movement of molecules across the gradient will occur until an equilibrium is reached. Many distillation processes depend mainly on the build-up of gas density at the area of vaporization to effectuate transportation of the vapor, i.e., diffusion of the vapor away from area of vaporization.

DISCLOSURE OF THE INVENTION

The present invention provides a means for maintaining a relatively sharp air pressure gradient between zones of vaporization and condensation in a distillation process without unduly interfering with diffusion of the vapors across this gradient to increase the efficiency of a distillation process. The present invention employs a vapor permeable barrier comprising a membrane having a plurality of openings which is disposed between the vaporization and condensation zones. The air pressure on the condensation zone side of the barrier is maintained substantially constantly lower than the air pressure on the vaporization zone side of the barrier, inducing diffusion of vapor through the membrane openings. The diffusing vapor expands as it crosses the gradient, achieving cooling by virtue of such expansion in the condensation zone in addition to the cooling provided by conventional means.

A sharp air pressure gradient is, of course, not achievable without the use of a physical barrier covering a substantial proportion of the cross-sectional area between the vaporization and condensation zones. An efficient distillation system must nonetheless allow significant diffusion across this gradient. The membrane utilized therefore has relatively small openings, preferably spaced a sufficient distance apart to maximize rates of diffusion through their small areas as discussed in *Plant Physiology*, Meyer and Anderson, 11th edition, D. Von Nostrand Co., Inc., 1949, Chapter XIII, incorporated herein by reference.

For the purposes of use of such a membrane to produce a sharp air pressure gradient while allowing efficient diffusion, the openings of the membrane have preferably a maximum diameter of about 0.3 millimeters, the distance between adjacent openings does not exceed about twenty times the diameter of the larger of the openings in question, and the cumulative areas of said openings occupy no more than about 5% of the total area of said membrane. These preferred dimensional requirements will be discussed in detail below.

The use of such a barrier providing a sharp air pressure gradient between the vaporization and condensation zones provides a system allowing efficient use of solar energy when combined with a solar energy collecting and transferring unit which heats air preferably under pressure, which air is then released to travel towards the barrier, passing, on its way, over the source of the distillate which preferably is also heated by solar energy. Such a system is preferably completely enclosed and operable continuously, the air being transferred from the condensation zone back into the initial heating zone as is described in more detail below.

The efficient use of a continuous circulating air system, particularly in conjunction with solar heating units, is, of course, dependent upon efficient condensation, i.e., removal of vapor from the air, provided by the barrier.

BRIEF DESCRIPTION OF THE DRAWINGS

FIG. 1 is a partially-diagrammatic, partially-cutaway, perspective view of a distillation device embodying features of the present invention; and FIG. 2 is an enlarged fragmentary elevated side view of a membrane embodying features of the present invention.

PREFERRED EMBODIMENTS OF THE INVENTION

The invention, as shown in FIG. 1, includes a distillation device, designated generally by the reference numeral 10, having a circulating air flow, designated generally by the arrows 12. The distillation device 10 includes a barrier 14 across the air flow 12, a zone for vaporization 16 downstream from the barrier 14, a zone for condensation 18 upstream of the barrier 14, and means for maintaining an air pressure gradient across the barrier which will be discussed in more detail below.

The barrier 14 provides a partial physical barrier to the air flow 12, preventing movement of air and other vapors at a rate equal to a theoretical 100% that would occur if no barrier 14 were present. The barrier 14 comprises a membrane 20 in which are located a plurality of pores or openings 22. The membrane 20 is preferably a thin sheet of material such as metal, plastic, or other material of suitable dimensional stability for the desired design of the distillation device. The membrane 20 should extend across the entire path of the air flow 12. The need for use of a thin sheet and the relative thinness required is dependent upon the rate of diffusion of gas through the membrane 20 desired, as is discussed below.

The openings 22 in the membrane 20 allow limited passage or diffusion of air 12 (and other vapors) through the membrane 20. (Generally in the distillation process, the air current 12 includes the normal composition of air plus the vapors of the distillate when downstream of the vaporization zone 16.) The membrane 20, with its openings 22, allows a relatively sharp air pressure gradient to be maintained thereacross, yet a significant rate of diffusion across the barrier 14 is nonetheless provided resulting in an efficient process.

The membrane 20, with its openings 22, is designed to utilize the "perimeter law" of gas diffusion through small apertures. Generally, a gas will diffuse through a small aperture of a given area at a greater rate than it diffuses through an equal area which is part of a larger unobstructed passage. The quantities of vapor diffusing through small openings is essentially proportional to the perimeter (circumference) of the opening rather than its area; the smaller the opening, the greater is the diffusion per unit area of the opening. Diffusion of gas through any opening occurs more rapidly at the rim of the opening than at the center because at the rim the concentration of gas molecules is less than the concentration outward of the center of the opening. The gas molecules diffusing through a single opening, if undisturbed, become distributed in hemispherical formation, or shell, immediately around the opening.

When a plurality of openings are present, diffusion through one opening increases the concentration of gas molecules at the rims of adjacent openings. If the openings are spaced a sufficient distance apart, this interference with adjacent diffusion is minimized and reduction in rate of diffusion due to diffusion through adjacent openings is negligible.

If openings of 0.3 millimeter diameters are placed 5 diameters apart, their cumulative area is about 3.4% of the total area but diffusion through these openings is 62% of that which would occur by unobstructed diffusion through the entire area. If these same openings were placed further apart, the number of openings per unit area decreases, as does the cumulative opening area per unit area. This decrease in the number of openings results in a decrease of total diffusion but these decreases are not proportional because the diffusion per opening increases as the distance between openings increases, to a maximum at about a distance of 20 diameters between openings.

Cumulative diffusion per unit opening area increases as the size of individual opening decreases. For instance, as mentioned above, openings of 0.3 millimeter diameter occupying about 3.4% of the total area, allowing diffusion of 62%, while openings of 0.05 millimeter occupying approximately the same area (3.2% of total) allow diffusion of 72% of total diffusion through an obstructed passageway of the same total area.

For the barrier 14 of the present invention, maintenance of a large air pressure gradient across the membrane 20 becomes more difficult as the rate of diffusion increases. The size of the openings 22 and their distance apart can be selected to meet given needs. The thinness of the membrane 20 is, of course, material-dependent, but the thinner the membrane 20, the greater will be the diffusion, the molecules swinging around the edge.

Referring to FIG. 2 also, the preferred openings 22 have a maximum diameter 24 of 0.3 millimeter. When the openings 22 are limited to a maximum of 0.3 millimeters, the preferred distance between adjacent openings 22 preferably does not exceed a distance 26 substantially equal to about 20 times the diameter of the larger of such openings, and such inter-opening distance 26 can, of course, be less. It is preferred, however, not to so closely space the openings that their total cumulative area exceeds that of 5% of the total area of the membrane 20.

The openings 22 can be circles, as shown in FIG. 2, or slit-like ellipses. In any instance, the diameter 24, as discussed herein, refers to the largest diametric dimension of the opening 22.

The barrier 14 can be advantageously utilized for any kind of distillation device to provide a sharp air pressure gradient between the vaporization zone 16 and the condensation zone 18. Such air pressure gradient provides efficient air flow 12 throughout the system, which air flow 12 can be cyclic, as will be described below for the preferred distillation device 10, or otherwise. In addition, the sharp air pressure gradient results in the expansion of the gas as it passes through the barrier 14, resulting in an automatic cooling effect. The greater the air pressure gradient, i.e., the greater the differential between molecular density on the vaporization zone side of the barrier 14 and that on the condensation zone side, the more of the gas molecules' own kinetic energy is used up to work against the attractive forces of neighboring gas molecules to achieve expansion therebetween. The kinetic energy of the gas molecules, i.e., their temperature, drops. This cooling on expansion allows efficient condensation with less external cooling means. Such a system can be advantageously adapted for use in any kind of distillation process. The maintenance of an air pressure gradient and efficient air flow is preferably combined with other specific components forming the solar distillation unit 10 shown in FIG. 1.

In the solar energy distillation device 10, solar (radiant) energy 28 is preferably utilized to heat both the liquid to be distilled 30, i.e., the source of the distillate, and the circulating air 32. An air heating compartment 34 is provided with means for compressing air, such as an air pump 36. The distillation device 10 is also preferably equipped with an air pressure gauge 38 and air-outlet safety valve 40 in proximity to the air heating compartment 34, such as along a portion of the air flow conduit 42 between the air pump 36 and air heating compartment 34.

The air heating compartment 34 is provided with a series of overhead glass panels 44, which are arranged in at least partially-overlapped positions and which are exposed preferably to direct solar energy 28. Below the glass panels 44 is a compressed air chamber 46 that may be an extension of the air flow conduit 42 or may be larger than the conduit 42 in cross-sectional area. Below the compressed air chamber 46 is a bed of material 48 having a high specific heat for storage of heat, which materials 48 are well known to those of ordinary skill in the art of solar heating. The compress air chamber 46 is preferably formed of a material having a high heat conductivity, such as copper with a black coated outer surface. The air heating compartment 34 is itself enclosed by the glass panels 44 on top and side walls 50 and bottom wall 52 which side and bottom walls 50, 52 may be lined with a radiant energy reflective material, such as extra heavy aluminum foil.

The air heating unit 34 and preferably the entire system from the air pump 36 to the condensation zone 18 may be encased in a thick shell of insulating material 54, such as fiberglass.

The compressed air chamber 46 is open to another length of air flow conduit 42 opposite the air pump 36 and the flow of air 32 thereinto is regulated by suitable means, such as an air flow valve 56. Downstream from the air flow valve 56 is a safety valve 58 and pressure gauge 58a which allow the distillation device 10 to be pressure controlled in different zones.

The air flow conduit 42 leads to an evaporation compartment 60. The air flow conduit 42 preferably is disposed in a downward direction aligned along the vertical along a portion of its length between the air heating compartment 34 and the evaporative compartment 60. The evaporative compartment 60 includes a pressure resistant enclosed tank 60a formed of material having a high heat conductivity, such as copper coated black on its outer surface.

The evaporation compartment 60 includes overhead glass panels 63, similar to those provided the air heating compartment 34, for heating both the air 32 and liquid to be distilled 30 which is maintained in the bottom of the evaporation tank 60a. The air 32 which flows through the evaporation tank 60a, is open to the liquid to be distilled 30, allowing this liquid 30 to evaporate and be carried to the condensation zone 18 with the air 32.

The evaporation compartment 60 is preferably equipped with means for maintaining a desired level of liquid to be distilled 30, such as a float valve 64, connected to, and automatically controlling, a source of the liquid 30, such as a water pipe 66, when the liquid to be distilled is water. The water pipe 66 can also be equipped with a manual valve 68 which permits flushing of the evaporation compartment 60 when desired to remove residual material which accumulates upon evaporation. The flushing waters can be drained through a normally-closed drain 70 preferably downstream from the water pipe 66.

The air flow conduit 42 leads the air 30 and vapor 72 hereinafter referred to as water vapor 72 for simplicity, from the evaporation compartment 60 to the condensation zone 18. The water vapor 72 passes through the barrier 14, which is described above and which is shown as cylindrical in shape, into a condensation chamber 74. The condensation chamber 74 is normally open to the system through the openings 22 in the side the membrane 20 in the downstream direction and through a portion of air flow conduit 42a that is open to the condensation chamber 74 close to its bottom and leads to the air pump 36 through a secondary condenser 76. Since the air pump 36 creates at least a partial vacuum in air flow conduit 42a, the condensation chamber 74 is maintained at a lower air pressure than the remainder of the system, resulting in the air pressure gradient across the barrier 14.

The condensation chamber 74 may be externally cooled, for instance with cooling water sprayed from overhead from cooling sprayers 78, which cooling waters are allowed to flow over the condensation chamber 74 into a cooling water tank 81 below. The cooling water is supplied to the sprayers 78 by any suitable means, such as a water pump 80 through a vertically-disposed water pipe 82.

The condenser chamber 74 is preferably provided with a plurality of overhead, vertically-disposed thin glass plates 84 that serve as additional moisture condensation surfaces.

An outlet 86 for the distillate is provided in the bottom wall 88 of the condensation chamber 74 which leads through a distillate conduit 90 to a distillate reservoir 92. The reservoir 92 is preferably positioned not only below but to the side of the condensation chamber 74. Preferably means for automatic drainage at a predetermined reservoir water level is provided, such as by the combination of a reservoir float valve 94 that operates a drain valve 96. Since the reservoir 92 is open to the condensation chamber 74 which is under reduced air pressure, the reservoir float valve 94 preferably controls the closing of a flow valve 98 across the distillate conduit 90 and a vent 100 to the atmosphere disposed between the flow valve 98 and the reservoir 92.

Any water vapor 72 condensing in the secondary condenser 76 is carried back to the condensation chamber 74 through the air flow conduit 42a which preferably opens immediately above the distillate outlet 86.

A combination vacuum and pressure gauge 102 may be provided in the air flow conduit 42a downstream from the air pump 36.

It is seen from the foregoing disclosure that the system can be operated with a continuous, recycling of the air 32 from a dry state, after effective condensation and efficient removal of distillate from contact with the air 32, to a heated compressed state, to a vapor containing state after passage through the evaporation compartment 60, through the condensation zone 18. The air 32 is kept in constant motion through the system, preferably at a sufficient flow rate to avoid total saturation of the air 32 with distillate vapor 72, which state would bring the exchange of vapor 72 to and from the air 32 into equilibrium and thereby be non-productive.

Industrial Applicability of the Invention

The distillation means of the present invention can be utilized for separation of liquids from other liquids or from substances that are solid under the evaporation conditions chosen. It can be used for purifying water, distilling alcohol from mash, and other numerous industrial separation processes.

I claim:

1. A closed cycle method for distilling a feed material comprising:
   (a) providing a distillation device comprising: a vaporization zone; a condensation zone; a perforated barrier positioned between the vaporization zone and the condensation zone, said barrier having a multiplicity of openings formed therein, said openings sized to permit air and vapor to pass therethrough; compressor means for maintaining an air pressure gradient across the perforated barrier such that air pressure on the vaporization zone side of the perforated barrier is greater than air pressure on the condensation zone side of the perforated barrier; and recirculating means for conducting air from the condensation zone to the compressor means to recirculate air and to provide a closed cycle distillation device, said openings dimensioned and positioned to co-act with the gradient maintained by the compressor means to substantially eliminate any reduction in the rate of diffusion through the openings due to diffusion through adjacent openings;
   (b) providing a feed material in the vaporization zone;
   (c) evaporating a vapor from the feed material in the vaporization zone;
   (d) operating the compressor means to establish an air pressure gradient across the perforated barrier in order to enhance the movement of the vapor through the openings into the condensation zone at a rate such that efficient vapor diffusion through the openings reduces the pumping load on the compressor means, and the dimensions and positions of the openings co-act with the pressure gradient to substantially eliminate any reduction in the rate of diffusion through the openings due to diffusion through adjacent openings, and the expansion of air and vapor after passage through the perforated barrier cools the air and vapor and thereby promotes condensation of vapor in the condensation zone;
   (e) condensing the vapor in the condensation zone; and
   (f) recycling air via the recirculating means from the condensation zone to the compressor means.

2. The invention of claim 1 wherein the maximum diameter of said openings is about 0.3 millimeter.

3. The invention of claim 2 wherein the distance between adjacent openings does not exceed a distance substantially equal to about 20 times the diameter of the larger of said adjacent openings and the total cumulative areas of said openings occupy no more than about 5% of the total area of said perforated barrier.

4. A closed cycle method for distilling a feed material comprising:
   (a) providing a solar energy distillation device comprising: an enclosed air heating compartment including at least one glass panel exposed to solar radiation; an enclosed evaporation compartment including a reservoir of feed material to be distilled; an enclosed condensation chamber provided with means for cooling air and means for removal of distillate; an enclosed conduit system that provides air flow through said air heating compartment, to and through said evaporation compartment, to and through said condensation chamber; a perforated barrier positioned across said air conduit system forming an inlet to said condensation chamber, said barrier having a multiplicity of openings formed therein, said openings sized to permit air and vapor to pass therethrough; compressor means for maintaining an air pressure gradient across the perforated barrier such that air pressure on the evaporation compartment side of the perforated barrier is greater than air pressure on the condensation chamber side of the perforated barrier and air flow through the air conduit system is maintained; and recirculating means for conducting air from the condensation chamber to the compressor means to recirculate air and provide a closed cycle distillation device, said openings dimensioned and positioned to co-act with the gradient maintained by the compressor means to substantially eliminate any reduction in the rate of diffusion through the openings due to diffusion through adjacent openings;
   (b) evaporating a vapor from the feed material in the evaporation compartment;
   (c) operating the compressor means to establish an air pressure gradient across the perforated barrier in order to enhance the movement of vapor through the openings into the condensation chamber at a rate such that efficient diffusion through the openings reduces the pumping load on the compressor means, and the dimensions and positions of the openings co-act with the pressure gradient to substantially eliminate any reduction in the rate of diffusion through the openings due to diffusion through adjacent openings, and the expansion of air and vapor after passage through the perforated barrier cools the air and vapor and thereby promotes condensation of vapor in the condensation chamber;
   (d) condensing the vapor in the condensation chamber; and
   (e) recycling air via the recirculating means from the condensation chamber to the compressor means.

5. The invention of claim 4 wherein said distillation device further comprises, in said air heating compartment, a bed of material having a high specific heat for storage of heat.

6. The invention of claim 5 wherein said evaporation chamber further includes at least one glass panel exposed to solar radiation for heating said reservoir of feed material to be distilled.

7. The invention of claim 4 wherein the maximum diameter of said openings in said perforated barrier is about 0.3 millimeter.

8. The invention of claim 7 wherein the distance between adjacent ones of said openings does not exceed a distance substantially equal to about twenty times the diameter of the larger of said adjacent openings and the total cumulative areas of said openings occupy no more than about 5% of the total area of said perforated barrier.

9. The invention of claim 7 wherein a flow valve is provided between the air heating compartment and the evaporation compartment, and the compressor means compresses air into the air heating compartment.

10. The invention of claim 9 wherein a secondary condenser is provided in the recirculating means, and said secondary condenser is open to said condensation chamber in close proximity to a distillate outlet.

11. The invention of claim 4 wherein said condensation chamber includes auxiliary condensation surfaces.

* * * * *